United States Patent [19]
Ho et al.

[11] Patent Number: 5,598,570
[45] Date of Patent: Jan. 28, 1997

[54] EFFICIENT DATA ALLOCATION MANAGEMENT IN MULTIPROCESSOR COMPUTER SYSTEM

[75] Inventors: Ching-Tien Ho, San Jose; Mandayam T. Raghunath, Berkeley, both of Calif.

[73] Assignee: International Business Machines Corporation, Armonk, N.Y.

[21] Appl. No.: 386,229

[22] Filed: Feb. 8, 1995

Related U.S. Application Data

[63] Continuation of Ser. No. 291,966, Aug. 17, 1994, abandoned, which is a continuation of Ser. No. 819,023, Jan. 10, 1992, abandoned.

[51] Int. Cl.$^6$ ........................................... G06F 15/76
[52] U.S. Cl. .................. 395/800; 364/229; 364/230; 364/DIG. 1
[58] Field of Search ........................ 395/800, 650; 364/229, 230, DIG. 1

[56] References Cited

U.S. PATENT DOCUMENTS

| | | | |
|---|---|---|---|
| 2,983,913 | 5/1961 | Zdanowich | 341/97 |
| 3,373,421 | 3/1968 | Wang | 341/97 |
| 3,675,236 | 7/1972 | Shoap | 341/97 |
| 4,119,961 | 7/1978 | Rockett, Jr. | 341/98 |
| 4,155,076 | 5/1979 | Rockett, Jr. | 341/97 |
| 4,409,587 | 10/1983 | Scott | 341/97 |
| 4,691,190 | 9/1987 | Robinson | 341/97 |
| 5,301,104 | 4/1994 | Yalamanchili | 395/800 |

FOREIGN PATENT DOCUMENTS

| | | | |
|---|---|---|---|
| WO-A-8808566 | 3/1988 | WIPO | |

OTHER PUBLICATIONS

S. L. Johnsson & C.-T. Ho, Algorithms for Matrix Transposition on Boolean N-Cube Configured Ensemble Architectures, 1988 Society for Industrial and Applied Mathematics, SIAM J. Matrix Anal. Appl., vol. 9, No. 3, pp. 419–454, Jul. 1988.

Bertsekas, Ozveren, Stamoulis, Tseng, Tsitsiklis, Optimal Communication Algorithms for Hypercubes, Journal of Parallel & Distributed Computing 11, pp. 263–275, 1991.

Chen, Shin, Subcube Allocation and Task Migration in Hypercube Multiprocessors IEEE Transactions on Computers, vol. 39, No. 9, pp. 1146–1155, Sep. 1990.

Chan, Saad, Multigrid Algorithms on the Hypercube Multiprocessor, IEEE Transactions on Computers, vol. c–35, No. 11, pp. 969–977, Nov. 1986.

Johnsson, Ho, Optimum Broadcasting & Personalized Communication in Hypercubes IEEE Transactions on Computers, vol. 38, No. 9, pp. 1250–1268, Sep. 1989

S. L. Johnsson, Communication efficient basic linear algebra computations on hypercube architectures. J. Parallel Distributed Comput., 4(2):133–172, Apr. 1987. (Tech. Rep. YALEU/DCS/RR–361, Yale Univ., New Haven, CT, Jan. 1985).

*Primary Examiner*—Alyssa H. Bowler
*Assistant Examiner*—John Harrity
*Attorney, Agent, or Firm*—James C. Pintner; Bo-In Lin

[57] ABSTRACT

The present invention comprises a computer system having a plurality of processors configured in an architecture having at least two subgraphs wherein at least a first subgraph and a second subgraph having the same topology and corresponding processors being stepwise complimentary for a data redistribution operation. Each processor of the computer system comprises a plurality of data-blocks and an executable program. The executable program performs the data redistribution operation by first exchanging in parallel the first half of the data-blocks of a processor in the first subgraph with the corresponding processor of the second subgraph. The redistributions of data with the corresponding stepwise complimentary processors are then simultaneously performed utilizing the full bandwidth of the data links. A reverse exchange of the first half of the data blocks between the processors of the first and the second subgraphs are then performed at the end.

17 Claims, 6 Drawing Sheets

HYPER-CUBE-LIKE MULTIPROCESSOR SYSTEM

BOOLEAN N-CUBES FOR N = 1 TO 4

BOOLEAN N-CUBES FOR N = 1 TO 4

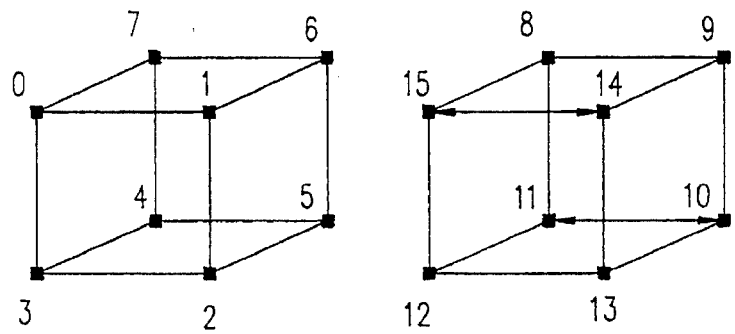
BINARY-REFLECTED GRAY CODE DATA MAPPING ON A 4-CUBE
FIG. 2A    PRIOR ART
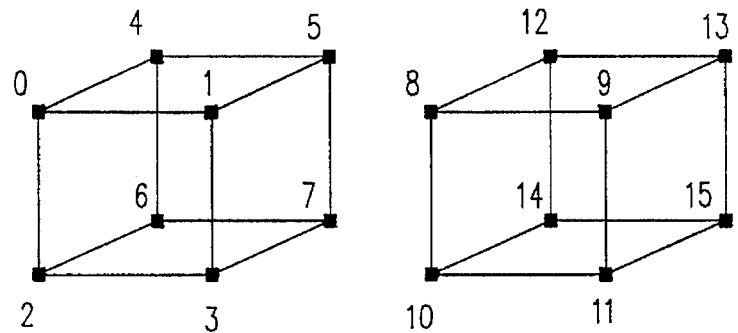
BINARY CODE DATA MAPPING ON A 4-CUBE
FIG. 2B    PRIOR ART
|  | SUBGRAPH | | |
|---|---|---|---|
|  | 0 | 1 | 2 |
| PART 0 | (0,0) | (1,0) | (2,0) |
| PART 1 | (0,1) | (1,1) | (2,1) |
| PART 2 | (0,2) | (1,2) | (2,2) |
BEFORE THE EXCHANGE
|  | SUBGRAPH | | |
|---|---|---|---|
|  | 0 | 1 | 2 |
| PART 0 | (0,0) | (0,1) | (0,2) |
| PART 1 | (1,0) | (1,1) | (1,2) |
| PART 2 | (2,0) | (2,1) | (2,2) |
AFTER THE EXCHANGE
FIG. 8

THE THREE EXCHANGE STEPS OF GRAY-TO-BINARY CONVERSION ON A 4-CUBE

HYPER-CUBE-LIKE MULTIPROCESSOR SYSTEM

A SUPERGRAPH COMPRISES TWO SUBGRAPHS

FIRST SUBGRAPH    SECOND SUBGRAPH

TWO SUBGRAPHS OF THE SUPERGRAPH AS SHOWN IN FIG. 6A

A SUPERGRAPH COMPRISES THREE SUBGRAPHS

SUBGRAPH 0  SUBGRAPH 1

SUBGRAPH 2

THREE SUBGRAPHS OF THE SUPERGRAPH AS SHOWN IN FIG. 7A

EFFICIENT DATA ALLOCATION MANAGEMENT IN MULTIPROCESSOR COMPUTER SYSTEM

This is a continuation of application Ser. No. 08/291,966 filed on Aug. 17, 1994, now abandoned which is a continuation of application Ser. No. 07/819,023 filed on Jan. 10, 1992 now abandoned.

FIELD OF THE INVENTION

This invention relates generally to the data allocation and transmission management for a computer system. More particularly this invention provides specific types of computer systems comprising a resource management system. This resource management system implements an improved allocation scheme among these processors, thereby the data transmission delays between these processors are minimized.

DESCRIPTION OF THE PRIOR ART

The performance of modern multiprocessor computer systems which may be configured in a variety of multiprocessor architectures is frequently limited by the data transmission delays between these processors. This is especially true for a distributed memory system which is easier to build and is more scalable in comparison to a multiprocessor system with shared memory. Therefore, an important design objective for a distributed memory multiprocessor is to arrange the topology of the interconnection network and the allocation of data blocks among theses processors such that the data transmission delays are minimized.

In a multiprocessor system, each processor is generally referred to as a node. To achieve processing concurrency, in a stream of data which often comprises a plurality of data blocks, the blocks are distributed among many nodes to be processed concurrently. In addition to local data processing within each node, it is often necessary to send or receive additional data from other nodes. The method of data-block distribution among the nodes and the connectivity of data links between the nodes often determine the through-put of a multiprocessor system. For specific types of data processes, careful design efforts to allocate data blocks between the nodes most suitable for the processes can minimize data transmission delays, and thus improve the performance of a multiprocessor system.

Several multiprocessors with hypercube, or hypercube-like, topologies have become commercially available. Current technology has made it both technically and economically feasible to build hypercubes with thousands of nodes. Some advantages of the hypercube topology are its logarithmic diameter, high communication bandwidth, regular structure, and the fact that many program structures can be mapped into it with adjacency preserved.

There are $2^n$ codes in an n-dimensional hypercube, and two coordinate points in each dimension. The nodes can be given addresses such that the addresses of adjacent nodes differ in precisely one bit. The hypercube is a recursive structure. An n-dimensional cube can be extended to an (n+1)-dimensional cube by connecting corresponding vertices of two n-dimensional cubes. One has the highest-order address bit zero (0) and the other the highest-order bit one (1). The recursive nature of the hypercube architecture is illustrated in FIG. 1A where hypercubes, (or often referred to as Boolean cubes of one, two, three and four dimensions) are shown. FIG. 1B is a more comprehensive illustration of the same hypercubes then that shown in FIG. 1A.

As there is increasing availability of intelligent run time support systems and libraries for parallel and distributed processing, solution of problems involving matrix operations, iterative methods for linear system equations, periodic boundary value problems, quantum electrodynamics and quantum chromodynamics can all be efficiently managed by a hypercube architecture. These types of problem solutions mostly employ nearest neighbor communications for data transmission between codes. The hypercube node-connectivity which preserves proximity, such as a binary-reflected Gray code (generally abbreviated as Gray code) shown in FIG. 2A is therefore most suitable for such types of computations. There are other types of computations such as Fast Fourier Transform (FFT), bitonic sort, and recursive doubling which can also be processed in parallel among these nodes. For these types of data processes, a tree or butterfly type of network is more efficient. A different hypercube labeling of node addresses, generally referred to as Binary code (shown in FIG. 2B) is used.

To efficiently manage the computational resources, a multiprocessor computer system must have the capability to convert from one type of data mapping to another in order to optimally utilize the processing power. This may occur in the case where a sixteen-node hypercube system with a Gray code data mapping is processing a matrix operation. As soon as it is completed, an FFT computation is scheduled to operate on the results obtained from the matrix operation. Reallocation of data blocks among these processors is required to first convert the data mapping on the hypercube from a Gray code data mapping, to Binary code data mapping such that the FFT computation can then be efficiently performed.

S. Lennart Johnsson, J. Parallel Distributed Computing, 4(2):133–172, April 1987, discloses a method for a hypercube architecture where data blocks are reallocated to convert from a Gray code to Binary code configuration. This method is shown in FIG. 3, where a three-step method for a four-dimensional hypercube is used to reallocate the data blocks from a Gray code data mapping to Binary code data mapping. For an n-dimensional hypercube, Johnsson disclosed that n−1 steps are sufficient to convert from a Gray code data mapping to Binary code data mapping.

The pseudo code for carrying out Johnsson's conversion is also shown in Appendix A. In the code, pid is the processor address of the current processor and nbr(j) is the processor address of the neighbor node across dimension j, i.e., $$nbr(j)=pid\oplus 2^j$$

There are two system calls, i.e., "send" and "recv", for sending and receiving messages, respectively. System call "send" takes four arguments: the starting memory location for the message, the processor address of the destination, the message size (in bytes), and the message type. The message type is used so that the receivers can specify a message of certain type from certain node(s). This is required by certain types of parallel computer such as the Intel iPSC/2 hypercube. System call "recv" takes three arguments: the four arguments for system call send excluding the processor address of the destination.

Referring to FIG. 3 and Appendix A, in step zero of FIG. 3, the sending and receiving of data blocks are only performed between nodes 2 (0010) and 3 (0011), and 6 (0110) and 7 (0111) in subcube zero and 10 (1010) and 11 (1011), and 14 (1110) and 15 (1111) in subcube one. For each of these nodes, the node address ID, i.e., pid, has a nonzero second least significant bit, to satisfy step (2) of Appendix A. That is, $gi+^{-1}_{+1}=1$, where i=0. Exchanges of data blocks are then carried out in FIG. 3 between these nodes. Similar data block exchanges are performed in steps 1 and 2 of FIG. 3.

By closely examining FIG. 3, one can immediately discover that in all three steps there are data communication links which are not used. For example, in step zero, there are no data block exchanges between nodes 0 and 1, nodes 4 and 5, nodes 8 and. 9, and nodes 12 and 13. These unused links can be potentially used to improve the efficiency of data reallocation in converting from a Gray code data mapping to Binary code data mapping.

SUMMARY OF THE PRESENT INVENTION

It is, therefore, an object of the present invention to provide to a hypercube multiprocessor computer system with a data block allocation management system to efficiently and optimally utilize the network bandwidth.

It is another object of the present invention to enable a hypercube or hypercube-like multiprocessor computer system to dynamically execute the data processing programs without unnecessary data reallocation delays.

It is another object of the present invention to provide a data reallocation system without requiring synchronous communication, whereby the sending and receiving of data blocks can be independently performed by each node in its proper order as soon as the data blocks to be sent or received are available.

It is another object of the present invention to efficiently and optimally manage the topology of a multiprocessor computer system to suit different computational requirements.

Briefly, the present invention comprises a computer system having a plurality of processors configured in an architecture having at least two subgraphs, wherein at least a first subgraph and a second subgraph have corresponding processors which are stepwise complimentary for a data redistribution operation. Each processor of the computer system comprises a plurality of data-blocks and an executable program. The executable program performs the data redistribution operation by first exchanging the first half of the data-blocks of a processor in the first subgraph with the first half of the data-blocks of the corresponding processor of the second subgraph.

The redistributions of data with the corresponding stepwise complimentary processors are then simultaneously performed utilizing the full bandwidth of the data links. A reverse exchange of the first half of the data blocks between the processors of the first and the second subgraphs is then performed at the end.

It is an advantage of the present invention that the time required for reallocation of data blocks to reconfigure a hypercube architecture from Gray code to Binary code is greatly reduced, especially for large-size data blocks.

It is another advantage of the present invention that the full bandwidth of the network between processors is utilized without idling.

It is another advantage of the present invention that the sending and receiving of data blocks can be performed without requiring a synchronous communication whereby the data block exchanges between adjacent nodes can be independently executed by each node in a proper order soon as the data blocks to be sent or received are made available to the sending or receiving node.

It is another advantage of the present invention that the topology of a multiprocessor computer system is very efficiently and optimally managed to suit different computational requirements.

These and other objects and the advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 2A is a schematic illustration of a hypercube multiprocessor computer system with Gray code data mapping;

FIG. 2B is a schematic illustration of a hypercube multiprocessor computer system with Binary code data mapping;

FIG. 8 shows in a tabulated form the data block exchanges to be performed before conducting a sequence of stepwise-complimentary data transmissions for a supergraph of FIG. 7A and 7B.

DETAILED DESCRIPTION OF THE PREFERRED EMBODIMENT

Referring to FIG. 3 again, a Gray code to binary code conversion in a four dimensional hypercube (sixteen nodes) as proposed by Johnsson is shown. In this distributed memory system, processors communicate with each other by sending and receiving messages each message containing a plurality of data blocks. Associated with each interprocessor communication, i.e., a sending or receiving operation, is a latency, or start-up time, denoted by $\tau$, and a transfer time per byte $t_c$. It is assumed that the link can transmit data in both directions at the same time and that each processor in an n-dimensional hypercube has n output and n input ports. For a one-port communication system, where only one input and one output port can be active at a given time per processor, a 'communication complexity' T for sending a K bytes message to a nearest neighbor is defined as $T=\tau+Kt_c$. The communication complexity of the hypercube 100 of FIG. 3 therefore comprises the sum of $Kt_c$, (the data transfer time) and 2) $\tau$ (the start-up time). In most cases the start-up time τ is a fixed constant caused by software overhead and hardware delay. For a given multiprocessor system, communication complexity improvements are generally achieved by reducing the data transfer time.

Figure 1A:
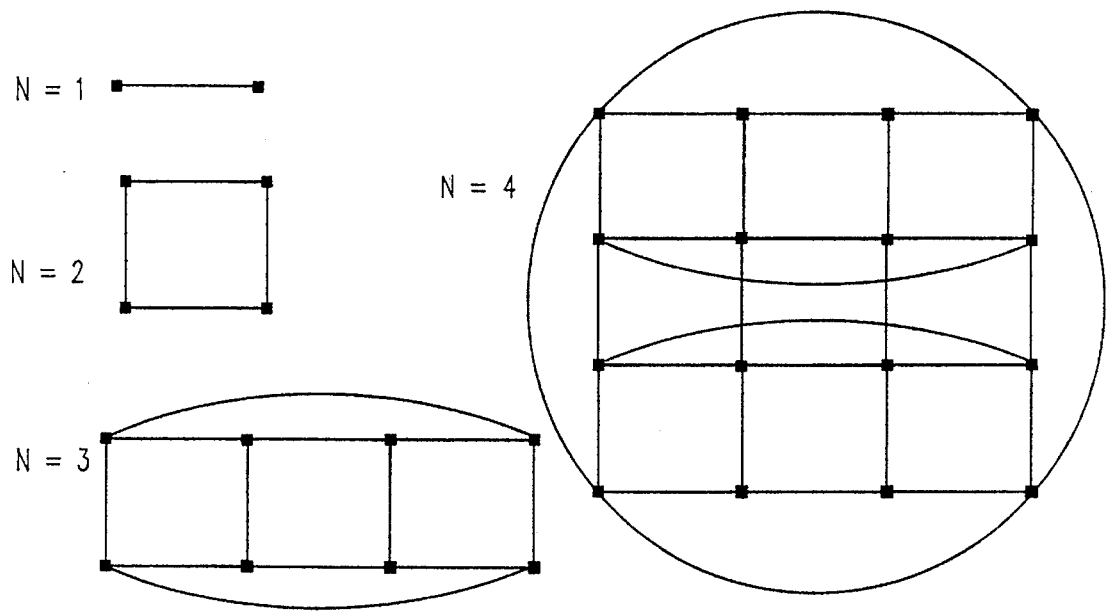
FIG. 1A is a schematic illustration of the recursive structure of hypercube multiprocessor computer system.
Figure 1B:
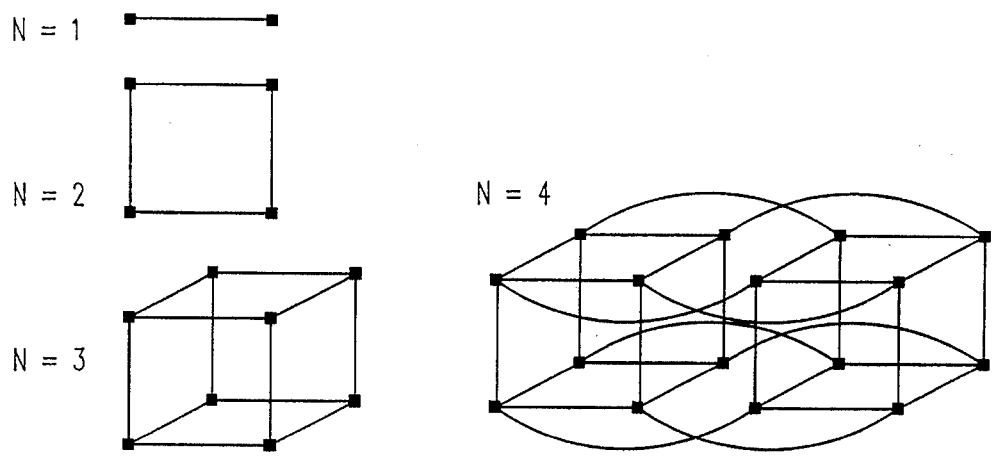
FIG. 1B is an alternative schematic illustration of FIG. 1A showing the recursive structure of hypercube multiprocessor computer system.
Figure 3:
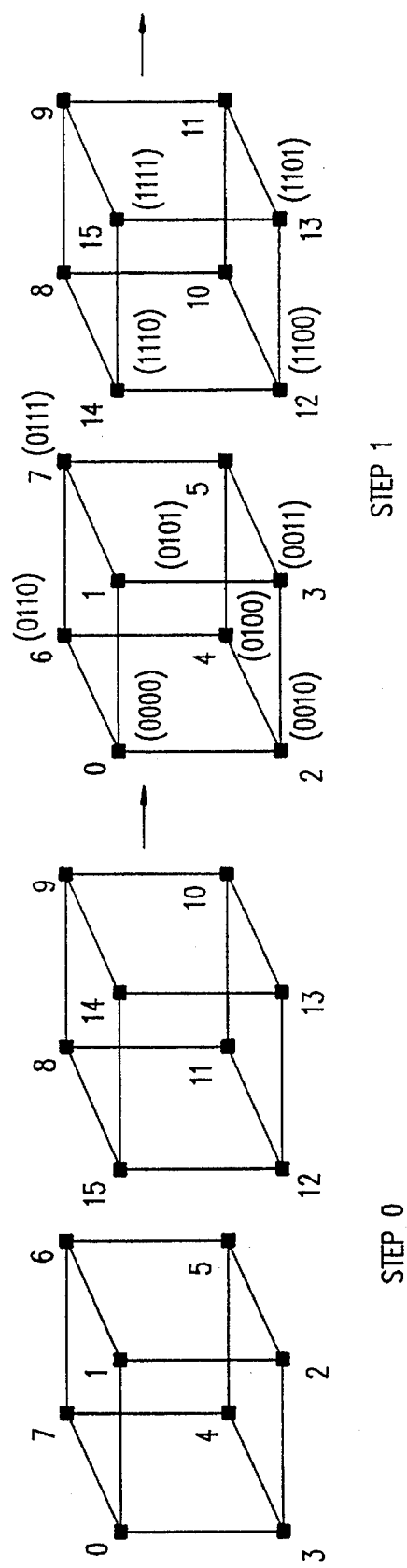
FIG. 3 is a schematic illustration of a Gray to Binary code conversion according to Johnson.
Figure 3:
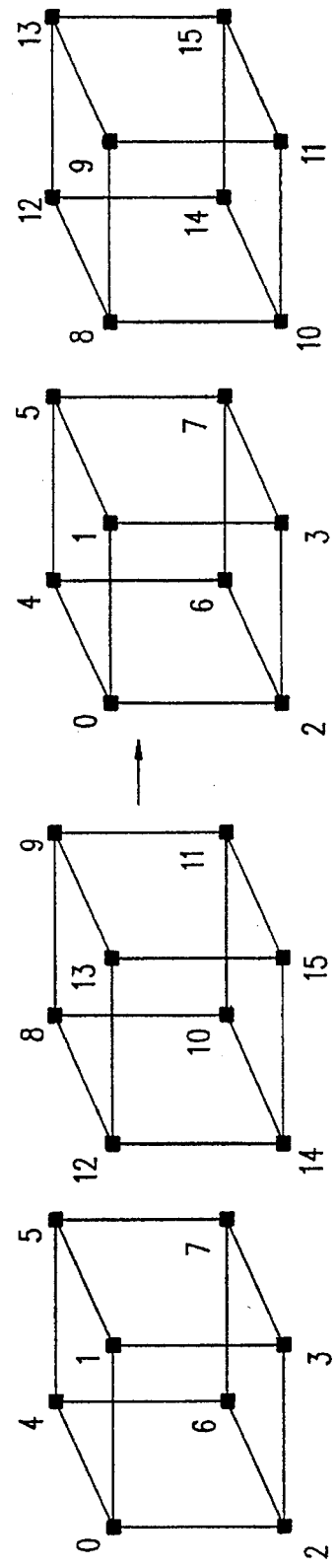

For an n-dimensional hypercube, Johnsson discloses a data reallocation method to convert the Gray code data mapping to Binary code data mapping which performs n−1 exchanges, as shown in FIG. 3 for a four dimensional cube. For an n-dimensional hypercube, the communication complexity according to Johnsson is $$T_{APPA} = (n-1)(\tau + Kt_c) \quad (1)$$

Where $T_{APPA}$ denotes the communication complexity for a hypercube system according to Appendix A.

For the rest of this paragraph, subcube 0 and subcube 1 are used to refer to subcubes with respect to the highest order dimension of a hypercube. For instance in FIG. 4 subcube 0 is the left subcube, and subcube 1 is the right subcube. Subcube 0 and subcube 1 are stepwise complimentary in each of the three steps for converting from a Gray code data mapping to Binary code data mapping. For instance, in step zero, when there are data exchange between nodes 2 and 3, there is no data exchange between corresponding nodes 12 and 13. Conversely, there is no data exchange between nodes 0 and 1 while there is data exchange between corresponding nodes 14 and 15. This complimentary attribute is most clearly demonstrated in step 2 in FIG. 3, where no data exchange is performed in subcube 0, while there are data exchanges between all corresponding nodes in subcube 1. In accordance with the invention, by exchanging half of the data between subcube 0 and subcube 1 before and after the Gray to Binary conversion, the full bandwidth of all the data links can be utilized.. In a time step when a pair of nodes in subcube 0 would not normally exchange data in the method proposed by Johnsson, the pair of subcube 0 nodes would also carry out data exchange corresponding to what are being performed in subcube 1. Hence, each subcube not only performs the Gray to Binary conversion for half of its data, but also performs the conversion for half of the data of the other subcube.

Appendix B lists the pseudo code executable by each node independently which performs such Gray to Binary conversion for an n-dimensional hypercube multiprocessor system. An exchange of the second half of the data block of each node with the second half of the data block of a corresponding node in another subcube is performed first. The full bandwidth of the data link between the nodes is utilized by making data exchanges of either the first half or the second half of the data blocks, depending on whether the exchange would have to be performed for the node itself or for a complimentary node as disclosed by Johnsson.

The data block exchanges according to the method of Appendix B are performed along the sequence of cube dimensions (n−1), 0, 1, . . . , (n−1) where the first exchange is to exchange data blocks between corresponding pairs of two (n−1)-dimensional subcubes. The 'communication complexity' which reflects the efficiency of data reallocation operations is:

$$T_{APPB} = (n+1)\left(\tau + \frac{K}{2} \times t_c\right) \quad (2)$$

Where $T_{APPB}$ denotes the communication complexity for a hypercube system according to Appendix B.

A further improvement is provided in this invention by performing data block exchanges along the sequence of cube dimension (n−2), 0, 1, . . . , (n−2). The basic principle of this improvement can be illustrated again by referring to FIG. 3. Each of the two subcubes (subcube 0 and subcube 1) can be further partitioned into two smaller subcubes along cube dimension (n−2). That is the original n-dimensional cube is partitioned into 4 subcubes of n−2 dimensions each. The four subcubes are labeled as subcube 00, 01, 10, and 11, where these two binary bits represent the two highest order bits of the processor addresses within, a subcube. As shown in FIG. 3, subcube 00 consists of four nodes having the two highest order bits with value 00, i.e., nodes 0 (0000), 1 (0001), 2 (0010), and 3 (0011), whereas subcube 01 consists of another four nodes having the highest order bits with value 01, i.e., nodes 4 (0100), 5 (0101), 6 (0110), and 7 (0111).

This improvement is made with the consideration that for each of the first (n−2) exchanges (i.e., step 0 through step (n−3)) as disclosed by Johnsson and shown in FIG. 3, if there is an exchange between nodes i and j in subcube 00 or subcubes 01, 10, and 11 respectively, then there is no exchange between corresponding nodes in subcube 01, or subcubes 00, 11, and 10 respectively. By exchanging in parallel half of the data (K/2) across dimension (n−2) before and after these (n−2) exchanges, only K/2 data elements need to be exchanged for each of these (n−2) exchanges. For convenience, refer to these two extra exchanges across dimension (n−2) as pre-exchange and post-exchange. Note that the last exchange step in Appendix A (i.e., step n−2, or step 2 in FIG. 3), which is an exchange along cube dimension (n−2), can be combined with the post-exchange step such that only K/2 data transfer are needed in the combined step. Thus, the Gray-to-binary conversion can be performed as data block exchanges along the sequence of cube dimension (n−2), 0, 1, . . . , (n−2), where each step exchanges data block of size K/2.

Appendix C lists the pseudo code executable by each node independently, without requiring synchronous communication, which performs the further improved Gray to Binary conversion for an n-dimensional hypercube multiprocessor system. A parallel exchange of the second half of the data block of each node with a corresponding node in another subcube along (n−2) dimension is performed first. The full bandwidth of the data link between the nodes is utilized by making data exchanges of either the first half or the second half of the data blocks, depending on whether the exchange would have to be performed for the node itself or for a complimentary node in another subcube along the (n−2) dimension as disclosed by Johnsson.

The data block exchanges according to the method of Appendix C are performed along the sequence of cube dimensions (n−2), 0, 1, . . . , (n−2), where the first exchange is to exchange data blocks between corresponding pairs of two (n−2)-dimensional subcubes. The 'communication complexity' which reflects the efficiency of data reallocation operations is:

$$T_{APPC} = n\left(\tau + \frac{K}{2} \times t_c\right) \quad (3)$$

where $T_{APPC}$ denotes the communication complexity for a hypercube system according to Appendix C.

Figure 4:
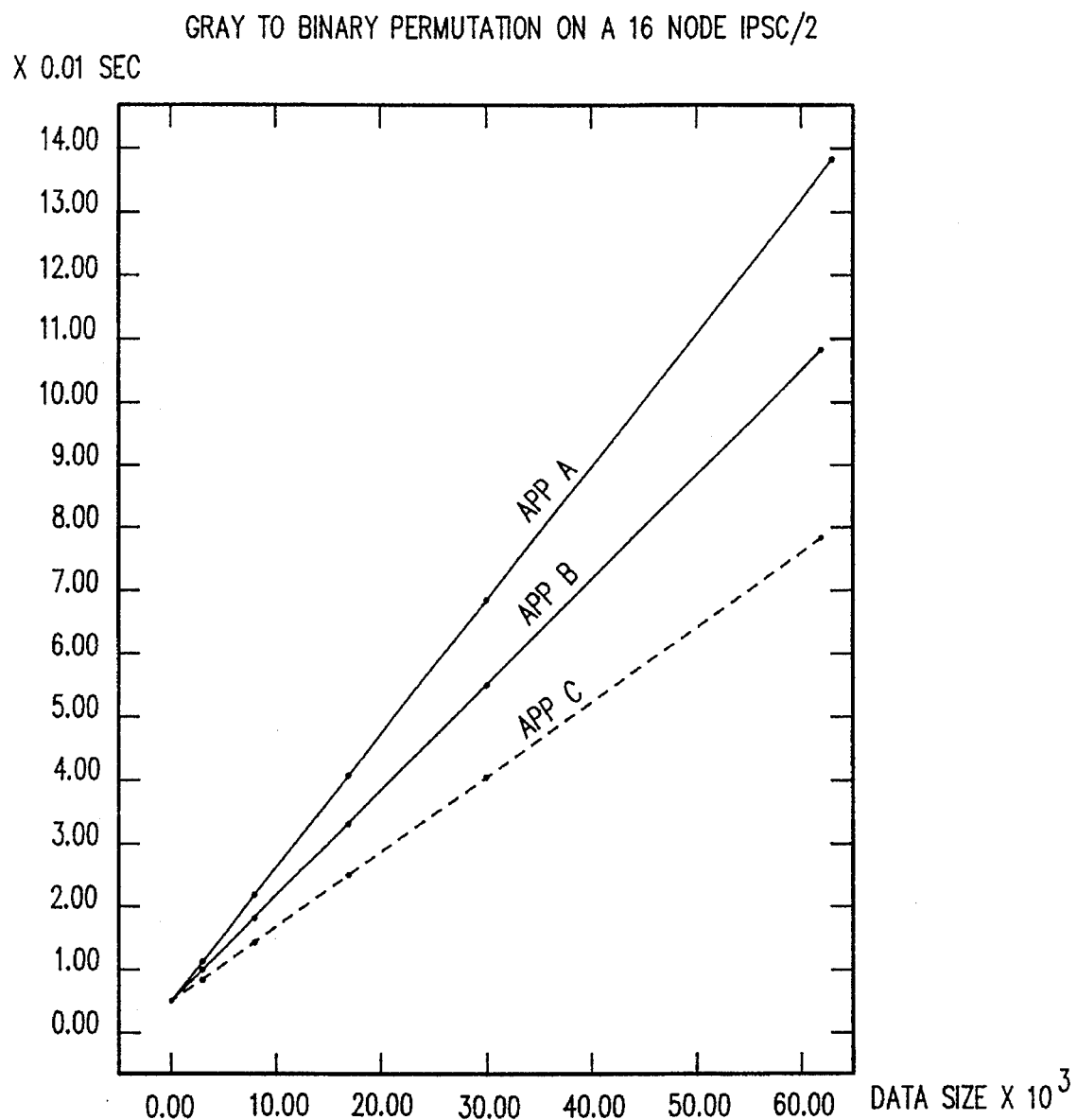
FIG. 4 is a comparison of the required time for Gray to Binary code conversion between Johnsson and the present invention.

An 16-node Intel iPSC/2 hypercube multiprocessor system with programs as specified in Appendices A, B, and C, i.e., APPA, APPB, and APPC, has been implemented to measure the communication complexity of a Gray to Binary conversion. All measured times on the iPSC/2 are the average values of at least 100 runs. FIG. 4 shows the measured times implementing these three pseudo codes. It can be observed from FIG. 4 that APPC is always better than APPB. For small data sizes, APPA is faster than both APPB and APPC, however for larger data size, i.e., K is greater than 2000 bytes, the performance of APPB and APPC exceeds that of APPA.

Figure 5:
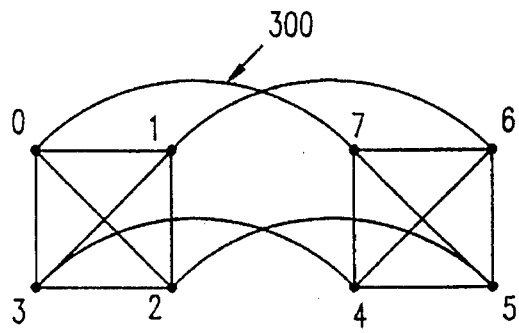
FIG. 5 is a schematic illustration of a hypercube-like multiprocessor computer system.

The attribute of stepwise complimentariness in converting from a Gary code data mapping to Binary code data mapping is true not only in a hypercube, but also in a hypercube-like architecture generally referred to as a supergraph of hypercube architecture, such as a three dimensional hypercube-like multiprocessor system 300 shown in FIG. 5. In comparison to a three dimensional hypercube system, additional data links connected between nodes 0 and 2, 1 and 3, 4 and 6, and 5 and 7, are provided in hypercube-like system 300. The data exchange steps as provided in the present invention for a hypercube system are applicable for a hypercube-like system such as the one shown in FIG. 5.

Figure 6A:
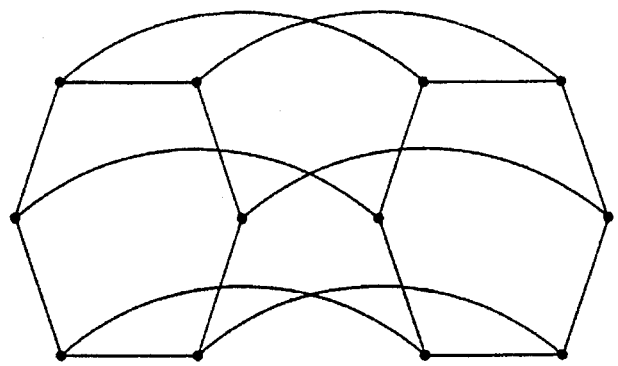
FIG. 6A is a schematic illustrations of a supergraph multiprocessor computer system.
Figure 6B:
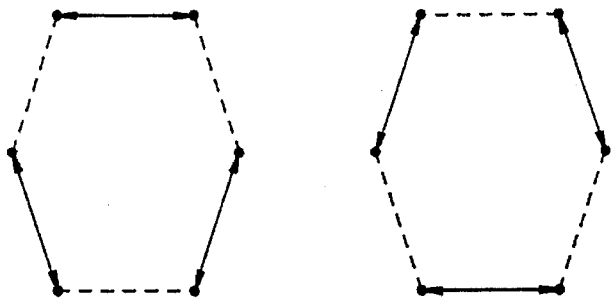
FIG. 6B is a schematic illustration of two sub-graphs of the supergraph as that shown in FIG. 6A.
Figure 7A:
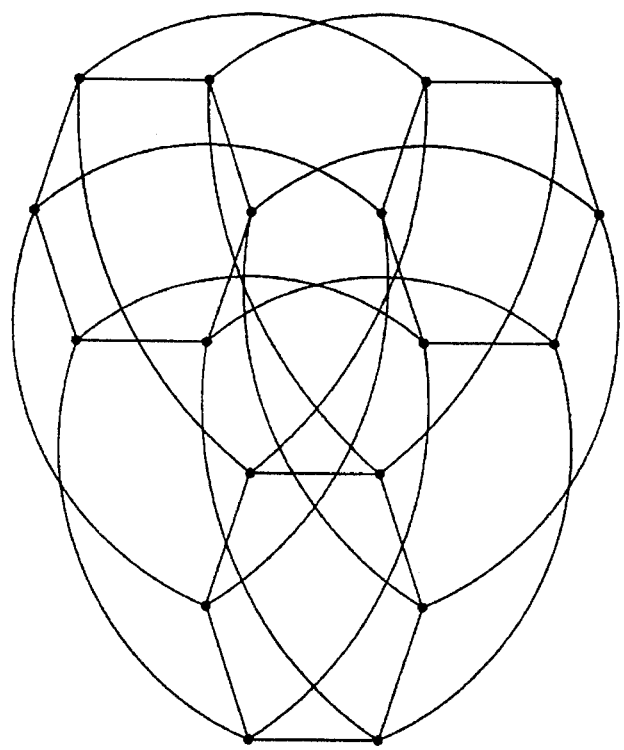
FIG. 7A is another schematic illustration of a supergraph multiprocessor computer system.
Figure 7B:
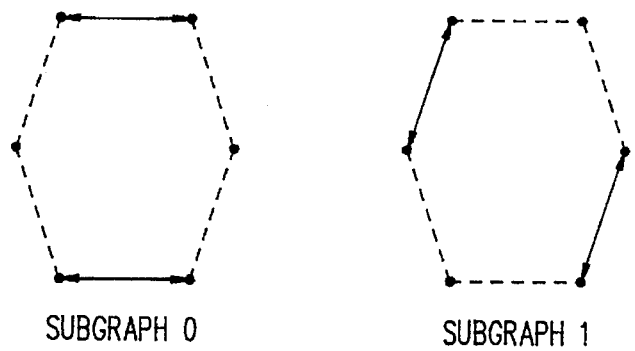
FIG. 7B is a schematic illustration of three subgraphs of the supergraph as that shown in FIG. 7A.
Figure 7B:
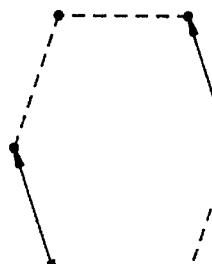

Other than hypercubes or hypercube-like architectures, a multi-processor system can be configured in a supergraph architecture which may comprise two, three or more subgraphs. An attribute of stepwise complimentariness between subgraphs in the operations of data block exchanges often exists, as shown by the examples illustrated in FIGS. 6A, 6B, 7A, and 7B. FIG. 6A and 6B shows a supergraph comprising two stepwise complimentary subgraphs, while FIG. 7A and 7B showing a supergraph comprising three stepwise complimentary subgraphs for a particular class of data-mapping conversion operations. Again, much of the data bandwidth is not utilized, since when data blocks are exchanged between two nodes in one subgraph, the data links between corresponding nodes in other subgraph(s) are idle. Efficiency of conversions between different data mappings may be improved as follows. First partition the data block of each processor into k parts of substantially equal size. Then each processor in the subgraph i exchanges in parallel its j-th part with the i-th part of the corresponding processor in the subgraph j.

The partitioning referred to above may be done in any suitable manner. For instance, where a communication model is available, a given partitioning may be used in conjunction with the model to compute a communication complexity for each data-block. The partitioning is chosen so as to minimize the communication complexities over all data blocks. See Johnsson et al., "Algorithms for Matrix Transposition on Bollean N-Cube Configured Ensemble Architectures", SIAM Matrix Anal. Appl., vol. 9, no, 3, July 1988. In particular, page 426, lines 1–14 describes an exemplary communication model from which the communication complexities are derived.

After these parallel pre-exchanges, the data block exchanges can be carried out among all the stepwise complimentary nodes simultaneously to utilize the full bandwidth of data links. Similar post-exchanges are then carried out to restore the data into the right subgraphs. Significant time savings can be achieved by use of the present invention, especially for the exchanges of data blocks of larger sizes.

FIG. 8 shows in a tabulated form the data exchanges to be performed before conducting a sequence of stepwise-complimentary data transmissions to fully utilize the data bandwidth for reducing the data transmission delays. As shown in FIG. 8, the data blocks in each subgraph are divided into three parts, i.e., part 0, part 1, and part 2 which are substantially of equal size. The parallel pre-exchanges are carried out for each processor in subgraph i, where $0 \leq i \leq 2$, and for each part j, where $0 \leq j \leq 2$ and $j \neq i$. The j-th part of a processor in said subgraph i is exchange with the i-th part of said corresponding processor of said subgraph j. The data blocks which are originally allocated to a node in subgraph 0 and being divided into part 1, i.e., data blocks (0,1) as denoted in FIG. 8, are now being allocated to a corresponding node in subgraph 1, part 0. Similarly, data blocks where are denoted as (0,2) are now being reallocated to a corresponding node in subgraph 2 part 0, etc. A sequence of redistributions of data with the corresponding stepwise complimentary processors are then simultaneously performed, making use of the full bandwidth of the data links connecting those processors. A reverse exchange as that shown in FIG. 8 is then performed after the stepwise complimentary data redistribution are completed.

Consider now a multiprocessor computer system configured in an architecture which has at least k subgraphs, designated as subgraph 0, 1, . . . , (k–1), each of these k subgraphs having the same topology, with corresponding processors being stepwise complimentary among these k processors. A more efficient data redistribution operation may be realized by first partitioning the data-blocks of a processor into k parts of substantially equal size. For each processor in subgraph i, where $0 \leq i \leq k-1$, and each part j, where $0 \leq j \leq k-1$ and $j \neq i$, exchange in parallel the j-th part of a processor in the subgraph i with the i-th part of said corresponding processor of the subgraph j. The redistributions of data with the corresponding stepwise complimentary processors can be simultaneously performed to make use of the full bandwidth of the data links among those processors. A reverse exchange is then carried out after the completion of the stepwise complimentary data redistributions.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

APPENDIX A

```
/* Algorithm AAPA: the half-bandwidth algorithm. */
(1)   for i := 0 to n − 2 do
(2)       if (g_{i+1}^{-1} = 1) then
(3)           send (A, nbr[i], len, type + i)
(4)           recv (A, len, type + i)
(5)       endif
(6)   endfor
```

APPENDIX B

```
/* Algorithm AAPB: the full-bandwidth algorithm. */
(1)   A1 := the first half of A
(2)   A2 := the second half of A
(3)   len1 := len/2
(4)   /* Exchange the second half of the data with another subcube. */
(5)   send (A2, nbr[n − 1], len1, type − 1)
(6)   recv (A2, len1, type − 1)
(7)   for i := 0 to n − 1 do
(8)       if (g⁻¹_{i+1}) then
(9)           send (A1, nbr[i], len1, type + i)
(10)          recv (A1, len1, type + i)
(11)      else
(12)          send (A2, nbr[i], len1, type + i)
(13)          recv (A2, len1, type + i)
(14)      endif
(15)  endfor
```

APPENDIX C

/* Algorithm AAPC: the improved full-bandwidth algorithm. */
(1)  A1 := the first half of A
(2)  A2 := the second half of A
(3)  len1 := len/2
(4)  /* Exchange the second half of the data with another subcube. */
(5)  send (A2, nbr[$n-2$], len1, type $-$ 1)
(6)  recv (A2, len1, type $-$ 1)
(7)  for $i := 0$ to $n-2$ do
(8)      if ($g_{i+1}^{-1} = 1$) then
(9)          send (A1, nbr[$i$], len1, type $+ i$)
(10)         recv (A1, len1, type $+ i$)
(11)     else
(12)         send (A2, nbr[$i$], len1, type $+ i$)
(13)         recv (A2, len1, type $+ i$)
(14)     endif
(15) endfor

We claim:

1. A method for converting a Gray code to a binary code data allocation for a n-dimensional hypercube multiprocessor computer system, each processor of the system having a processor address of n bits and each processor having a plurality of data-blocks, each given processor having a neighbor in an i-th dimension, i being a dimensional and bit index having an integral value in the range ($0 \leq i \leq (n-1)$) such that the given processor and the i-th dimension neighbor processor have processor addresses which are identical except for the i-th bit thereof, the method being implemented for execution by the processors of the system, the method comprising the steps of:

(a) for each processor, dividing the data-blocks thereof into first and second halves;

(b) exchanging in parallel the second half of the data-blocks of each processor with the second half of the data blocks of a neighbor processor along an (n−2)-th dimension of said processor and (c) executing in parallel in each processor, for an index i, wherein i:=0 to n−2, the following steps:
  (i) determining if an (i+1)-th bit of an inverse Gray code of the processor address has a value of one; and
  (ii) if a value of one is determined in step (i), exchanging the first half of said data-blocks, with the first half of the data-blocks of a neighbor processor along the i-th dimension of said processor, otherwise exchanging the second half of said data-blocks, with a the second half of the data-blocks of a neighbor processor along the i-th dimension of said processor.

2. A computer system comprising a plurality of processors, each processor of the computer system including:

an n-bit processor address;

data storage means for storing a plurality of data blocks, each given processor having a neighbor in an i-th dimension, i being a dimensional and bit index having an integral value in the range ($0 \leq i \leq (n-1)$) such that the given processor and the i-th dimension neighbor processor have processor addresses which are identical except for an i-th bit thereof;

a program storage medium; and an executable program, stored in the program storage medium, for directing the computer system to convert from a Gray code to a binary code data location, the program including means for:
(a) exchanging in parallel a first half of the data-blocks of each processor with a first half of the data-blocks of a neighbor processor along the (n−2)-th dimension of said processor; and
(b) executing in parallel in each processor, for an index i, wherein i:=0 to n−2, the following steps:
  (i) determining if the (i−1)-th bit of an inverse Gray code of the processor address has value of one; and
  (ii) if a value of one is determined in step (i), exchanging the first half of said data blocks with the first half of the data-blocks of a neighbor processor along the i-th dimension of said processor, otherwise exchanging the second half of said data-blocks with the second half of the data-blocks of a neighbor processor along i-th dimension of said processor.

3. A computer system as recited in claim 2, wherein the processors are configured in an n-dimensional hypercube architecture.

4. A computer system as recited in claim 2, wherein the processors are configured in a subgraph of an n-dimensional hypercube architecture.

5. A computer system as recited in claim 2, wherein the processors are configured in a recursive n-dimensional architecture with two subgraphs having stepwise complimentary communication patterns.

6. A method for redistributing data blocks among a plurality of processors configured in an architecture represented by a graph having a first subgraph and a second subgraph having the same topology, the first subgraph representing first respective ones of the processors, the second subgraph representing second respective ones of the processors, each first respective processor corresponding with one of the second respective processors, the method being implemented for execution by the processors, the method comprising the steps of:

(a) exchanging, in parallel, a first half of the data-blocks of a processor in said first subgraph with a first half of the data-blocks of said corresponding data-blocks of a processor of said second subgraph;

(b) redistributing data, with corresponding stepwise complimentary processors simultaneously performing said step of redistributing; and (c) executing a reverse exchange of the first halves of the data blocks as that of step (a) between said processors of said first and said second subgraphs.

7. A computer system comprising a plurality of processors configured in an architecture represented by a graph having a first subgraph and a second subgraph having the same topology, the first subgraph representing first respective ones of the processors, the second subgraph representing second respective ones of the processors, each first respective processor corresponding with one of the second respective processors, each of the computer system including:

data storage means for storing a plurality of data blocks;

a program storage medium; and an executable program, stored in the program storage medium, for directing the processor to perform said data redistribution operation, the program comprising means for:
(a) exchanging, in parallel, a first half of the data-blocks of a processor in said first subgraph with a first half of the data-blocks of said corresponding processor of said second subgraph;
(b) redistributing data, with corresponding stepwise complimentary processors simultaneously performing said step of redistributing; and
(c) executing a reverse exchange of the first halves of the data blocks and that of step (a) between said processors of said first and said second subgraphs.

8. A method for redistributing data blocks among a plurality of processors configured in an architecture represented by a graph having at least k subgraphs designated as subgraph 0, 1, ... , (k−1), each of said k subgraphs having the same topology, each subgraph representing a respective subset of the processors, each given processor of a given one of the subgraphs corresponding to, and being coupled to, a respectively corresponding processor of a second one of the subgraphs, the method being implemented for execution by the processors, the method comprising the steps of:

(a) partitioning the data-blocks of each processor into k parts of substantially equal size;

(b) exchanging, in parallel, for each processor in a subgraph represented by a running index i, where $0 \leq i \leq k-1$, and each part represented by a running index j, where $0 \leq j \leq k-1$, and $j \neq i$, said j-th part of the data-blocks of a processor in said subgraph i with an i-th part of said data-blocks of a corresponding processor of a subgraph j;

(c) redistributing data, with corresponding stepwise complimentary processors simultaneously performing said step of redistributing; and (d) repeating step (b) above as a reverse exchange.

9. A computer system comprising a plurality of processors configured in an architecture represented by a graph having at least k subgraphs designated as subgraph 0; 1, ..., (k−1) subgraph, each of said k subgraphs having the same topology, the first subgraph representing first respective ones of the processors, the second subgraph representing second respective ones of the processors, each first respective processor corresponding with one of the second respective processors, each processors of the computer system including:

data storage means for storing a plurality of data-blocks;

a program storage medium; and an executable program, stored in the program storage medium, for directing the processor to perform said data redistribution operation, the program comprising means for:

(a) partitioning the data-blocks of each processor into k parts of substantially equal size;

(b) exchanging, in parallel, for each processor in a subgraph represented by a running index i, where $0 \leq i \leq k-1$, and each part represented by a running index j, where $0 \leq j \leq k-1$, and $j \neq i$, said j-th part of the data-blocks of a processor in said subgraph i with a i-th part of said data-blocks of a corresponding processor of a subgraph j;

(c) redistributing data, with corresponding stepwise complimentary processor simultaneously performing said step of redistributing (d) repeating step (b) above as a reverse exchange.

10. For use with a processing system including a plurality of nodes, each node including data storage means for storing data at the node, the nodes of the processing system having a predetermined set of interconnections therebetween, the set of interconnections defining a plurality of subsets of the nodes, each subset including respectively corresponding nodes and a corresponding set of interconnections, each given node of a given subset being connected to the corresponding node of each other subset of the plurality of subsets, a method for converting the processing system from a first type of data mapping in which data is stored at the nodes according to a first allocation scheme, to a second type of data mapping in which the data is stored at the nodes according to a second allocation scheme, the method comprising the steps of:

for at least some given ones of the nodes, performing a pre-exchange of a predetermined portion of data stored at a given node of the given subset with a predetermined portion of data stored at a node of another subset which corresponds with the given node;

re-allocating the data between nodes to convert from the first allocation scheme to the second allocation scheme; and for the at least some given ones of the nodes, performing a post-exchange of a predetermined portion of data stored at the given node of the given subset with a predetermined portion of data stored at the node of another subset which corresponds with the given node;

whereby the steps of performing a pre-exchange and a post-exchange increase bandwidth utilization and decrease idling on the interconnections between the nodes during the step of re-allocating.

11. A method as recited in claim 10, wherein:

the first and second allocation schemes include, respectively, first and second ID schemes in which each node is assigned a unique binary number ID, each given node of a given subset having an assigned binary number ID which is related to an assigned binary number ID of the corresponding node of each other subset of the plurality of subsets;

the method for converting includes re-assigning the binary number IDs between at least some of the nodes; and the step of performing a pre-exchange includes exchanging the predetermined portions of data based on the related binary number IDs of the corresponding nodes for which the pro-exchange is performed.

12. A processing system comprising:

a plurality of nodes, each node including data storage means for storing data at the node;

a predetermined set of interconnections between the nodes, the set of interconnections defining a plurality of subsets of the nodes, each subset including respectively corresponding nodes and a corresponding set of interconnections, each given node of a given subset being connected to the corresponding node of each other subset of the plurality of subsets; and program means for converting the processing system from a first type of data mapping in which data is stored at the nodes according to a first allocation scheme, to a second type of data mapping in which the data is stored at the nodes according to a second allocation scheme, the program means comprising means for:

for at least some given ones of the nodes, performing a pre-exchange of a predetermined portion of data stored at a given node of the given subset with a predetermined portion of data stored at a node of another subset which corresponds with the given node, re-allocating the data between nodes to convert from the first allocation scheme to the second allocation scheme, and for the at least some given ones of the nodes, performing a post-exchange of a predetermined portion of data stored at the given node of the given subset with a predetermined portion of data stored at the node of another subset which corresponds with the given node;

whereby the operation of the means for performing a pre-exchange and a post-exchange increase bandwidth utilization and decrease idling on the interconnections between the nodes during operation of the means for re-allocating.

13. A processing system as recited in claim 12, wherein:

the first and second allocation schemes include, respectively, first and second ID schemes in which each node is assigned a unique binary number ID, each given node of a given subset having an assigned binary number ID which is related to an assigned binary number ID of the corresponding node of each other subset of the plurality of subsets;

the means for converting includes means for re-assigning the binary number IDs between at least some of the nodes; and the means for performing a pre-exchange includes means for exchanging the predetermined portions of data based on the related binary number IDs of the corresponding nodes for which the pre-exchange is performed.

14. A node, for use with a processing system including a plurality of nodes, the node comprising:

data storage means for storing data at the node;

an interface for coupling the node to interconnections of a predetermined set of interconnections between the nodes of the processing system, the set of interconnections defining a plurality of subsets of the nodes, each subset including respectively corresponding nodes and a corresponding set of interconnections, the node being included within a given subset and being connected to the corresponding node of each other subset of the plurality of subsets, and program means for facilitating conversion of the processing system from a first type of data mapping in which data is stored at the nodes according to a first allocation scheme, to a second type of data mapping in which the data is stored at the nodes according to a second allocation scheme, the program means comprising means for:

performing a pre-exchange of a predetermined portion of data stored at the node with a predetermined portion of data stored at a node of another subset which corresponds with the node;

re-allocating the data between the node and other nodes of the processing system to convert from the first allocation scheme to the second allocation scheme; and performing a post-exchange of a predetermined portion of data stored at the node with a predetermined portion of data stored at the node of the other subset which corresponds with the node;

whereby the steps of performing a pre-exchange and a post-exchange increase bandwidth utilization and decrease idling on the interconnections between the node and the node of the other subset during the step of re-allocating.

15. A node as recited in claim 14, wherein:

the first and second allocation schemes include, respectively, first and second ID schemes in which each node is assigned a unique binary number ID, each given node of a given subset having an assigned binary number ID which is related to an assigned binary number ID of the corresponding node of each other subset of the plurality of subsets;

the means for facilitating conversion includes means for re-assigning the binary number IDs between the node and other nodes of processing system; and the means for performing a pre-exchange includes means for exchanging the predetermined portions of data based on the related binary number IDs of the node and the corresponding node for which the pre-exchange is performed.

16. For use with a node of a processing system including a plurality of nodes, each node including data storage means for storing data at the node, the nodes of the processing system having a predetermined set of interconnections therebetween, the set of interconnections defining a plurality of subsets of the nodes, each subset including respectively corresponding nodes and a corresponding set of interconnections, each given node of a given subset being connected to the corresponding node of each other subset of the plurality of subsets, a computer program product for directing the node to facilitate conversion of the processing system from a first type of data mapping in which data is stored at the nodes according to a first allocation scheme, to a second type of data mapping in which the data is stored at the nodes according to a second allocation scheme, the computer program product comprising:

a recording medium;

means, recorded on the recording medium, for directing the node to perform a pre-exchange of a predetermined portion of data stored at the node with a predetermined portion of data stored at a node of another subset which corresponds with the node;

means, recorded on the recording medium, for directing the node to re-allocate the data between nodes to convert from the first allocation scheme to the second allocation scheme; and means, recorded on the recording medium, for directing the node to perform a post-exchange of a predetermined portion of data stored at the node with a predetermined portion of data stored at the node of another subset which corresponds with the node;

whereby the means for directing to perform a pre-exchange and a post-exchange increase bandwidth utilization and decrease idling on the interconnections between the nodes during operation of the means for directing to re-allocate.

17. A computer program product as recited in claim 16, wherein:

the first and second allocation schemes include, respectively, first and second ID schemes in which each node is assigned a unique binary number ID, each given node of a given subset having an assigned binary number ID which is related to an assigned binary number ID of the corresponding node of each other subset of the plurality of subsets;

the conversion includes re-assigning the binary number IDs between at least some of the nodes; and the means for directing to perform a pro-exchange includes means, recorded on the recording medium, for directing the node to exchange the predetermined portions of data based on the related binary number IDs of the corresponding nodes for which the pre-exchange is performed.

* * * * *

UNITED STATES PATENT AND TRADEMARK OFFICE
CERTIFICATE OF CORRECTION

PATENT NO. : 5,598,570
DATED : January 28, 1997
INVENTOR(S) : Ching-Tien Ho and Mandayam T. Raghunath It is certified that error appears in the above-indentified patent and that said Letters Patent is hereby corrected as shown below:

Column 3, line 4, change "$gi+^{-1}_{+1}$" to -- $g_{i+1}^{-1}$ --.

Column 15, line 51 (claim 2, line 22), change "(i-1)-th" to --(i+1)-th--.

Signed and Sealed this

Nineteenth Day of August, 1997

BRUCE LEHMAN

*Attest:*

*Attesting Officer*     *Commissioner of Patents and Trademarks*